US012676324B2

(12) United States Patent \
Lee

(10) Patent No.: US 12,676,324 B2 \
(45) Date of Patent: Jul. 7, 2026

(54) APPARATUS FOR MANUFACTURING A SUBSTRATE FOR FUEL CELL AND APPARATUS FOR MANUFACTURING ELECTRODE FOR FUEL CELL INCLUDING SAME

(71) Applicants: HYUNDAI MOTOR COMPANY, Seoul (KR); KIA CORPORATION, Seoul (KR)

(72) Inventor: Hoon Hui Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 852 days.

(21) Appl. No.: 18/074,100

(22) Filed: Dec. 2, 2022

(65) Prior Publication Data

US 2023/0216068 A1 Jul. 6, 2023

(30) Foreign Application Priority Data

Jan. 6, 2022 (KR) ......................... 10-2022-0001869

(51) Int. Cl. \
*H01M 8/0297* (2016.01) \
*H01M 8/1004* (2016.01)

(52) U.S. Cl. \
CPC ....... *H01M 8/0297* (2013.01); *H01M 8/1004* (2013.01)

(58) Field of Classification Search \
CPC ............. H01M 8/1004; H01M 8/0297; H01M 4/8814; H01M 4/8828; H01M 4/88; H01M 4/881 \
See application file for complete search history.

(56) References Cited

U.S. PATENT DOCUMENTS

2010/0266927 A1 * 10/2010 Suzuki ................ H01M 8/1062 \
429/479

* cited by examiner

*Primary Examiner* — Sarah A. Slifka \
(74) *Attorney, Agent, or Firm* — Morgan Lewis & Bockius LLP

(57) ABSTRACT

The present disclosure relates to an apparatus for manufacturing a substrate for a fuel cell and an apparatus for manufacturing an electrode for a fuel cell, which can make it possible to reduce loss of a catalyst and loss of an electrolyte membrane, improve a processing speed, and precisely form a pattern shape of an electrode although the electrode is continuously formed on a substrate when applying catalyst slurry on the substrate comprising a release film or the electrolyte membrane and thus forming the electrode.

13 Claims, 7 Drawing Sheets

RELEASE FILM
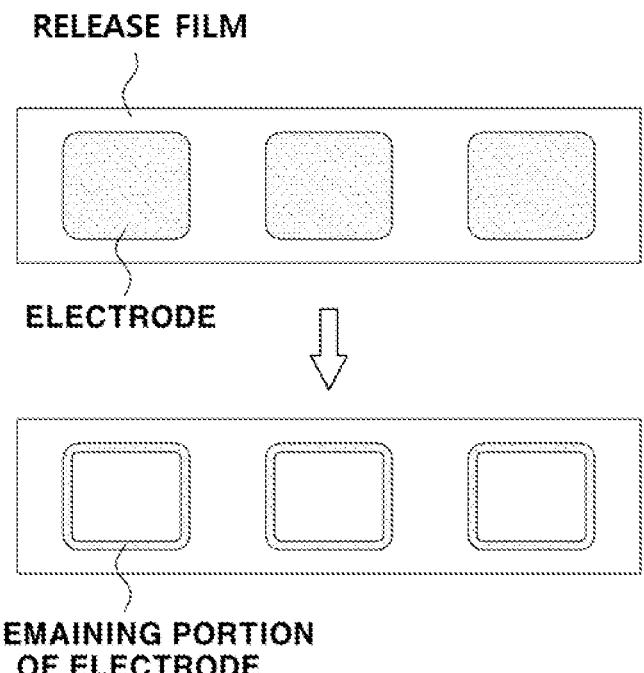
ELECTRODE
REMAINING PORTION
OF ELECTRODE
FIG.1  -RELATED ART-
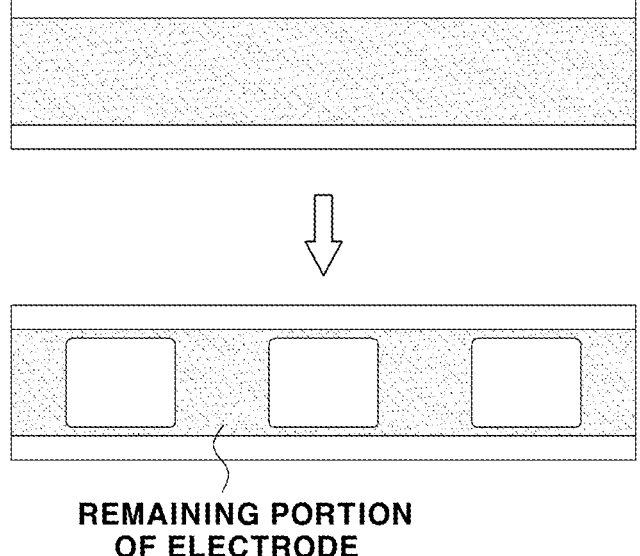
REMAINING PORTION
OF ELECTRODE
FIG.2  -RELATED ART-

60

61          62

61          62

APPARATUS FOR MANUFACTURING A SUBSTRATE FOR FUEL CELL AND APPARATUS FOR MANUFACTURING ELECTRODE FOR FUEL CELL INCLUDING SAME

CROSS REFERENCE TO RELATED APPLICATION

The present application claims the benefit of priority to Korean Patent Application No. 10-2022-0001869, filed on Jan. 6, 2022 in the Korean Intellectual Property Office, the entire contents of which is incorporated herein for all purposes by reference.

TECHNICAL FIELD

The present disclosure relates to an apparatus for manufacturing a substrate for a fuel cell and an apparatus for manufacturing an electrode for a fuel cell. More specifically, the present disclosure relates to an apparatus that is capable of manufacturing a catalyst layer in a pattern shape by folding up the substrate, temporarily holding the folded-up substrate in a secured manner, then continuously applying catalyst slurry to the substrate to form a catalyst layer, before forming the catalyst layer on the substrate comprising at least one of a release film, an electrolyte membrane, or any combination thereof, and spreading out the folded-up substrate. The use of the manufacturing apparatus according to the present disclosure can reduce loss of a catalyst layer and loss of electrolyte membrane and can improve a processing speed when manufacturing a membrane-electrode assembly (MEA).

BACKGROUND

Usually, when manufacturing the MEA of a fuel cell, a method of applying catalyst slurry on a release film to form a catalyst layer, and transferring the catalyst layer to a electrolyte membrane is used. At this time, catalyst slurry is applied on the release film discontinuously as illustrated in FIG. 1 or continuously as illustrated in FIG. 2, in such a manner as to form a pattern.

However, in the method, as described above, of applying the catalyst slurry on the release film in such a manner as to form the pattern, the catalyst layer may not be precisely formed in an intended pattern shape according to properties of the catalyst slurry, such as viscosity. In the method of continuously applying the catalyst slurry, when transferring the catalyst layer to the electrolyte membrane, a portion of the catalyst layer is remaining on the release film, thereby leading to an increase in the cost of manufacturing the MEA.

The foregoing is intended merely to aid in the understanding of the background of the present disclosure, and is not intended to mean that the present disclosure falls within the purview of the related art that is already known to those skilled in the art.

SUMMARY

One aspect of the present disclosure is to provide a method of minimizing a portion of a catalyst layer that is unnecessarily wasted when manufacturing an electrode for a fuel cell.

Another aspect of the present disclosure is to provide a method of shaping an electrode formed by appropriately transforming a release film and continuously applying catalyst slurry into an electrode having a pattern.

According to an aspect of the present disclosure, an apparatus for manufacturing a substrate for a fuel cell, the apparatus including: a supply unit proving a film; a bonding unit positioned after the supply unit and forming a substrate including folded regions that result from intermittently folding up portions of the film and a non-folded region between the folded regions; and a collection unit positioned after the folding-up unit and collecting the substrate.

In the apparatus, the substrate may include a release film or an electrolyte membrane.

In the apparatus, the bonding unit may include: a first roller member positioned on one side of the film and rotatable in a state of being brought into contact with the film; a first pressing member positioned on an opposite side of the first roller member with the film interposed therebetween in a first direction and supporting a lower surface of the film; a second roller member positioned to be spaced apart from the first roller member in a lengthwise direction, positioned on the one side of the film and rotatable in a state of being brought into contact with the film; and a second pressing member positioned to be spaced apart from the first pressing member in the lengthwise direction, positioned on the opposite side of the second roller member with the film interposed therebetween, and supporting the lower surface of the film, wherein at least one of the first pressing member or the second pressing member is disposed to be laterally movable.

In the apparatus, the first pressing member may include a first pressing surface facing a predetermined area at an end portion of the second pressing member, and the second pressing member may include a second pressing surface facing a predetermined at an end portion of the first pressing member.

In the apparatus, the bonding unit may include an adhesive supply member positioned between the first roller member and the second roller member and providing an adhesive to an upper surface of the film.

In the apparatus, the adhesive supply member may further provide the adhesive along a widthwise direction of the film perpendicular to the lengthwise direction and thus to form an adhesive line, and a length of the adhesive line may be greater than a predetermined width of an electrode.

In the apparatus, the bonding unit may further include a bar positioned between the first roller member and the second roller member and pressing against the film in the first direction.

In the apparatus, the bonding unit may operate: a first phase of rotating the first roller member and the second roller member in a forward direction and moving the film in a progress direction; a second phase of stopping the rotation of the first roller member and the second roller member and thus securely holding the film; a third phase of rotating the second roller member in a reverse direction and thus a portion of the film enters a space between the first pressing member and the second pressing member; a fourth phase of laterally moving at least one of the first pressing member or the second pressing member and forming the substrate by folding up the portion of the film; and a fifth phase of returning the at least one of the first pressing member or the second pressing member to an original position thereof, rotating the first roller member and the second roller member in the forward direction, and moving the substrate in the progress direction.

In the apparatus, the adhesive supply member may provide an adhesive to the film in the second phase.

According to another aspect of the present disclosure, an apparatus for manufacturing an electrode for a fuel cell, the apparatus comprising: the apparatus for manufacturing the substrate for the fuel cell; and an coating unit providing catalyst slurry to the substrate and thus forming a catalyst layer, the substrate being supplied to the coating unit from the apparatus for manufacturing the substrate for the fuel cell.

The apparatus may further include a restoration unit positioned after the application unit, receiving the substrate on which the catalyst layer is formed, and spreading out the folded region of the substrate.

In the apparatus, the restoration unit may include a holding member securely holding the substrate on which the catalyst layer is formed; and a moving member positioned after the holing member, pulling the securely held substrate, and thus spreading out the folded region of the substrate.

In the apparatus, the holding member may hold the edge of the substrate on which the catalyst layer is formed except for the catalyst layer.

According to the present disclosure, a remaining portion of the catalyst layer that is unnecessarily wasted while the catalyst is transferred after being formed on the release film or the like.

According to the present disclosure, in a case where an electrode in a pattern shape cannot be formed due to properties catalyst slurry, such as viscosity, the catalyst layer in the pattern shape can be formed with the electrode formed by continuously applying the catalyst slurry. Accordingly, loss of the electrode can be minimized by comparison with a method of transferring the catalyst layer onto the electrolyte membrane formed by successively applying catalyst slurry on the substrate.

In a case where the catalyst slurry is directly applied to the catalyst film is employed, the electrode in the pattern shape is not formed due to the properties of the catalyst slurry. Thus, the catalyst slurry and the electrolyte membrane can be both lost. According to the present disclosure, in such a case, the catalyst layer in the pattern shape can be formed by continuously applying the catalyst slurry on the electrolyte membrane, and thus catalyst slurry and the electrolyte membrane can be prevented from being lost.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 illustrates a step in the related art of forming an electrode in a pattern shape and then transferring the formed electrode;

FIG. 2 illustrates a step in the related art of continuously forming the electrode and transferring the formed electrode;

DETAILED DESCRIPTION

Figure 3:
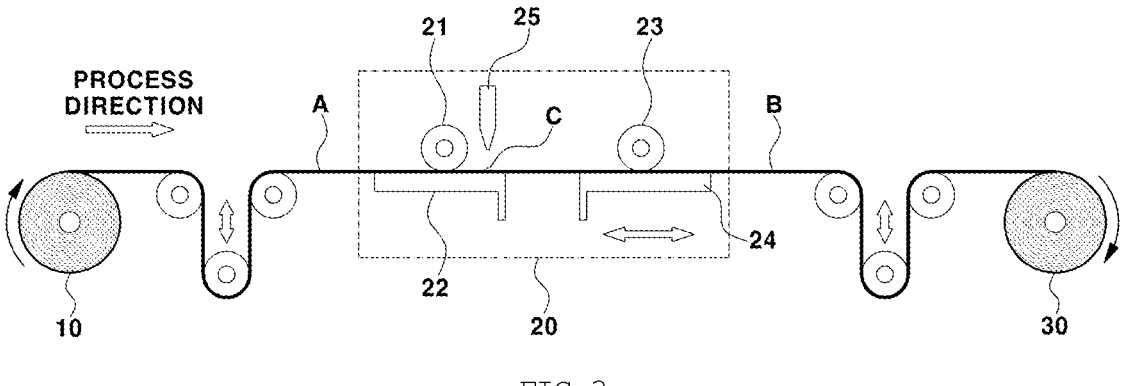
FIG. 3 illustrates an apparatus for manufacturing the substrate for the fuel cell according to one exemplary embodiment of the present disclosure.

The above-mentioned objectives, other objectives, features, and advantages of the present disclosure would be easily understood from a desired embodiment that will be described below with reference to the accompanying drawings.

In the drawings that are referred to for description, the same constituent elements are given the same reference numeral. Constituent elements in the accompanying drawings appear larger than it is actually because they are magnified by increasing dimensions thereof to clearly describe the embodiment of the present disclosure. The terms first, second, and so on are used to describe various constituent elements, but should not impose any limitation on the meanings of the constituent elements. These terms are used only to distinguish one element from another. For example, a first constituent element may be named a second constituent element without departing from the scope of the present disclosure. In the same manner, the second constituent element may also be named the first constituent element. A noun in singular form has the same meaning as when used in plural form, unless it has a different meaning in context.

It should be understood that the terms "include", "have", and the like, when used in the present specification, each specify the presence of a feature, a number, a step, an operation, a constituent element, a component, and/or a combination thereof but do not preclude the possible presence or addition of one or more other features, numbers, steps, operations, constituent elements, components, and/or combinations thereof. In addition, a component, such as a layer, a film, a region, or a plate, when expressed as being on the "top" of another component, is meant to be vertically on another component, and, when expressed as being "over" or "above" another component, may be meant to be "over" or "above" another component with a third component in between. In addition, a component, such as a layer, a film, a region, or a plate, when expressed as being "underneath" another component, is meant to be vertically "underneath" another component, and, when expressed as being "under" or "below" another component, may be meant to be "under" or "below" another component with a third component in between.

FIG. 3 illustrates an apparatus for manufacturing a substrate for a fuel cell according to one exemplary embodiment of the present disclosure. With reference to FIG. 3, the apparatus may include a supply unit 10, a bonding unit 20, and a collection unit 30. The supply unit 10 provides a film A. The bonding unit 20 is positioned after the supply unit 10 and forms the substrate B by folding up a portion of the film A. The collection unit 30 is positioned after the bonding unit 20 and collects the substrate B.

The apparatus for manufacturing the substrate for the fuel cell may employ a roll-to-roll system. The supply unit 10 and the collection unit 30 may be a roll or a roller on which the film A is wound. The film A undergoes a sequence of processing steps in the bonding unit 20 and is wound up back into a roll in the collection unit 30.

The substrate may include a release film or an electrolyte membrane.

The release film may include at least one of a polyethylene-based film, a polyimide-based film, or any combination thereof.

Any electrolyte membrane that is usually used in the field of fuel cell technology may be used as the above-mentioned electrolyte membrane. According to need, the electrolyte membrane may be supplied in a state of being supported on the release film.

The bonding unit 20 is configured to form the substrate B by folding up a portion of the film A.

Figure 5:
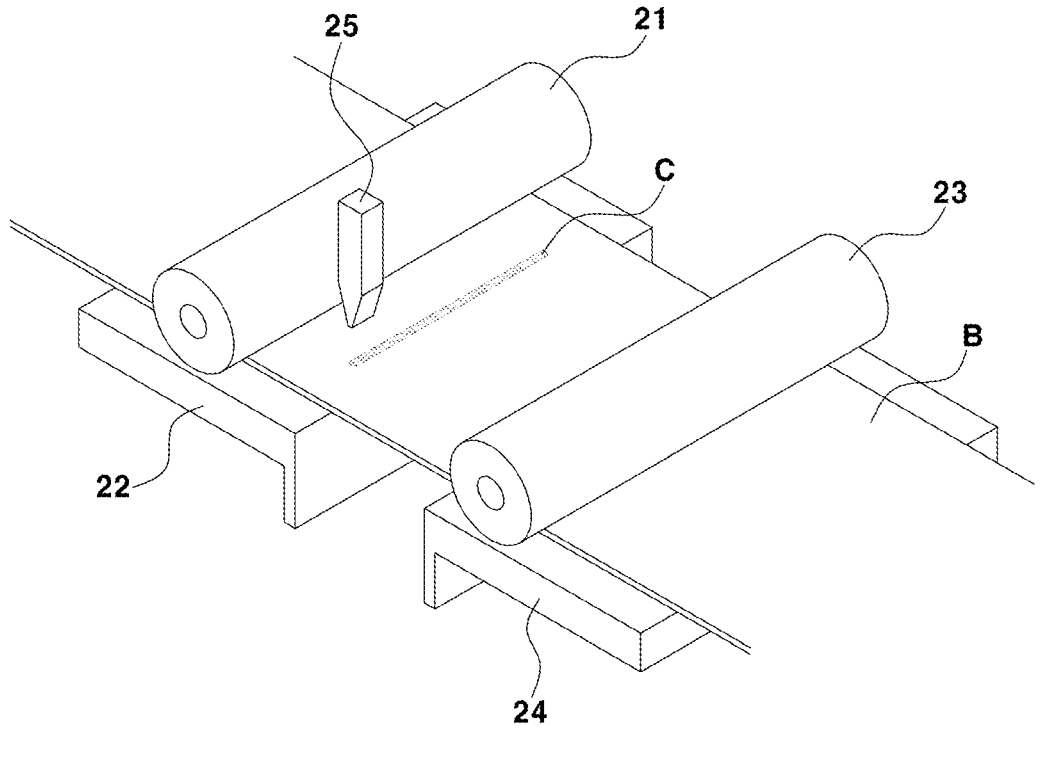
FIG. 5 illustrates the bonding unit according to one exemplary embodiment of the present disclosure.

With reference to FIGS. 3 and 5, the bonding unit 20 may include a first roller member 21, a first pressing member 22, a second roller member 23, and a second pressing member 24. The first roller member 21 is positioned on one side of the film A and rotates in a state of being brought into the film A. The first pressing member 22 supports a lower surface of the film A at a position that is on the other side of the film A from the first roller member 21. The second roller member 23 is positioned to be spaced a predetermined distance apart from the first roller member 21, is positioned on the one side of the film A and rotates in a state of being brought into contact with the film A. The second pressing member 24 is positioned to be spaced a predetermined distance apart from the first pressing member 22 and supports the lower surface of the film A at a position that is on the other side of the film A from the second roller member 23.

Figure 4:
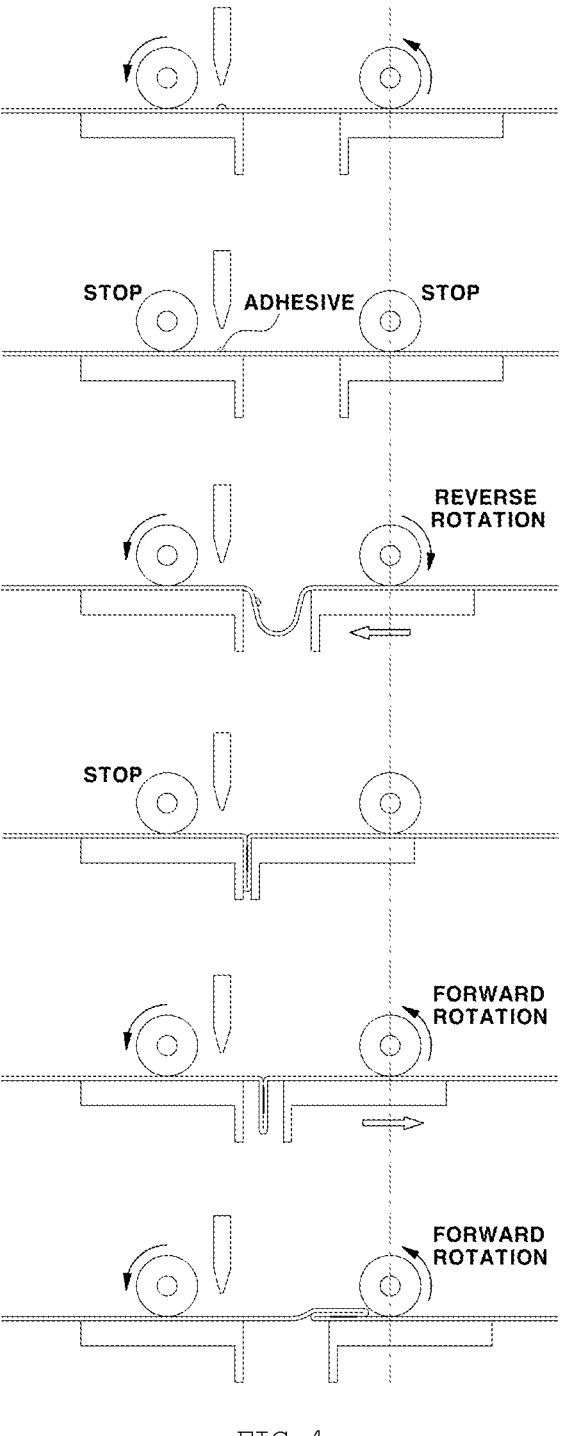
FIG. 4 refers to for description of a technique of operating the bonding unit in FIG. 3.

With reference to FIG. 4, a method of operating the bonding unit 20 may include: a first phase of rotating the first roller member 21 and the second roller member 23 in a forward direction and moving the film A in a progress direction; a second phase of stopping the rotation of the first roller member 21 and the second roller member 23 and thus securely holding the film A; a third phase of rotating the second roller member 23 in a reverse direction and thus a portion of the film A enters a space between the first pressing member 22 and the second pressing member 24; a fourth phase of laterally moving at least one of the first pressing member 22 or the second pressing member 24 and forming the substrate B by folding up the portion of the film A; and a fifth phase of returning at least one of the first pressing member 22 or the second pressing member 24 to an original position thereof, rotating the first roller member 21 and the second roller member 23 in the forward direction, and moving the substrate B in the progress direction. The bonding unit 20 may repeat the first phase to the fifth phase.

The apparatus may further include a control unit for adjusting the operation of each component of the bonding unit 20 in each phase.

The control unit of the apparatus according to an exemplary embodiment of the present disclosure may be a processor (e.g., computer, microprocessor, CPU, ASIC, circuitry, logic circuits, etc.). The control unit may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

Figure 9:
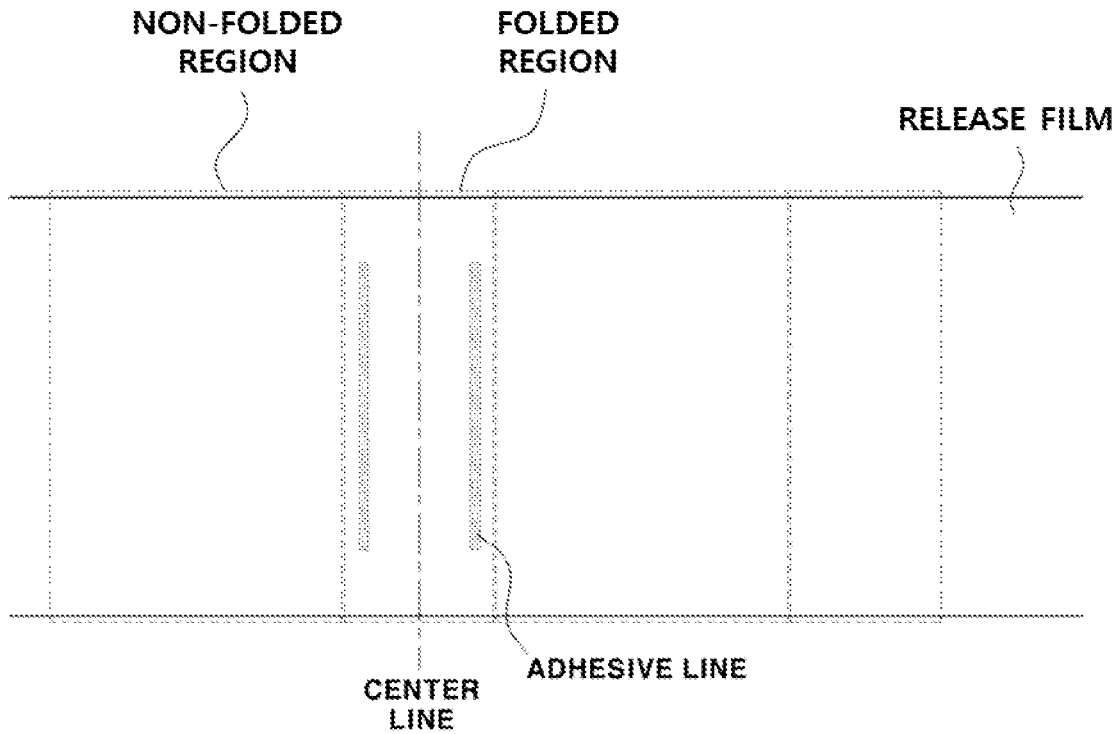
FIG. 9 refers to for description of the substrate according to one exemplary embodiment of the present disclosure.

With reference to FIG. 9, the substrate B may include a folded region that results from the intermittent folding up along a lengthwise direction thereof and a non-folded region between the folded regions. The lengthwise direction here means a moving direction of the film from the supply unit 10 up to the collection unit 30.

Desirably, starting and ending points of the folded region of the substrate B are brought into contact with each other for folding-up in the lengthwise direction.

The folded region of the substrate B is bent toward the center line thereof in such a manner that both sides thereof are folded on each other in a symmetrical manner.

The bonding unit 20 may further include an adhesive supply member 25 that provides an adhesive to the film A.

The adhesive supply member 25 may provide a adhesive to an upper surface of the film A in the second phase.

The adhesive may be applied to an edge of the film in order to securely hold the entire folded region of the substrate B in a state of being fold up. Desirably, the adhesive is applied to a portion of a surface of the folded region of the substrate B that is adjacent to the non-folded region.

The adhesive is applied on the film A, desirably in a linear shape, and forms an adhesive line C. At this point, desirably, the adhesive C is formed along the widthwise direction of the film A.

The first pressing member 22 and the second pressing member 24 have respective pressuring surfaces that face each other. Desirably, an area of the pressing surface is greater than half an area of the folded region of the substrate B.

The bonding unit 20 may further include a bar (not illustrated) that is positioned between a first folding-up roller 21 and a second folding-up roller 23 that presses against the film A in the direction of gravity.

An apparatus for manufacturing an electrode of a fuel cell according to one exemplary embodiment of the present disclosure may include: an apparatus for manufacturing the substrate; and an application unit which is positioned after the apparatus for manufacturing the substrate, to which the substrate B is provided, and which applies catalyst slurry on the substrate B and thus forms a catalyst layer.

Figure 6:
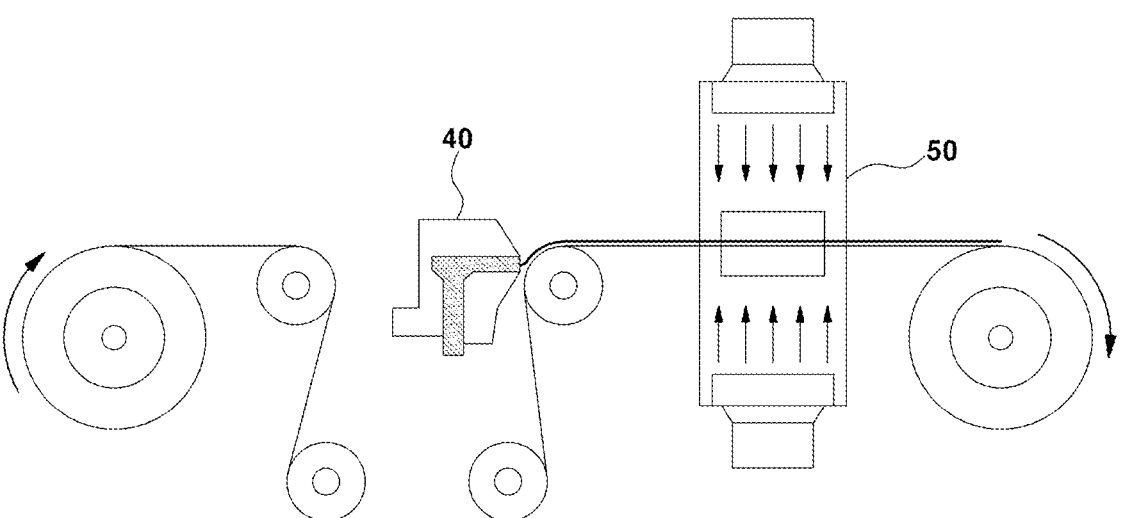
FIG. 6 illustrates the coating unit and a drying unit according to one exemplary embodiment of the present disclosure.

FIG. 6 illustrates the application unit 40. With reference to FIG. 6, the application unit 40 may include a slot-die coating device that discharges the catalyst slurry.

The catalyst slurry may include a catalyst, ionomer, and the like. The catalysts may include a metal catalyst, a non-metal catalyst, and the like. The ionomer may include a perfluorosulfonic acid polymer or the like. The apparatus for manufacturing the electrode for the fuel cell may further include a drying unit 50 that is positioned after the application unit 40 and dries the catalyst layer.

The apparatus for manufacturing the electrode for the fuel cell may further include a restoration unit which is positioned after the application unit 40, to which the substrate on which the catalyst layer is formed is provided, and which spreads out the folded region of the substrate B.

Figures 7, 8:
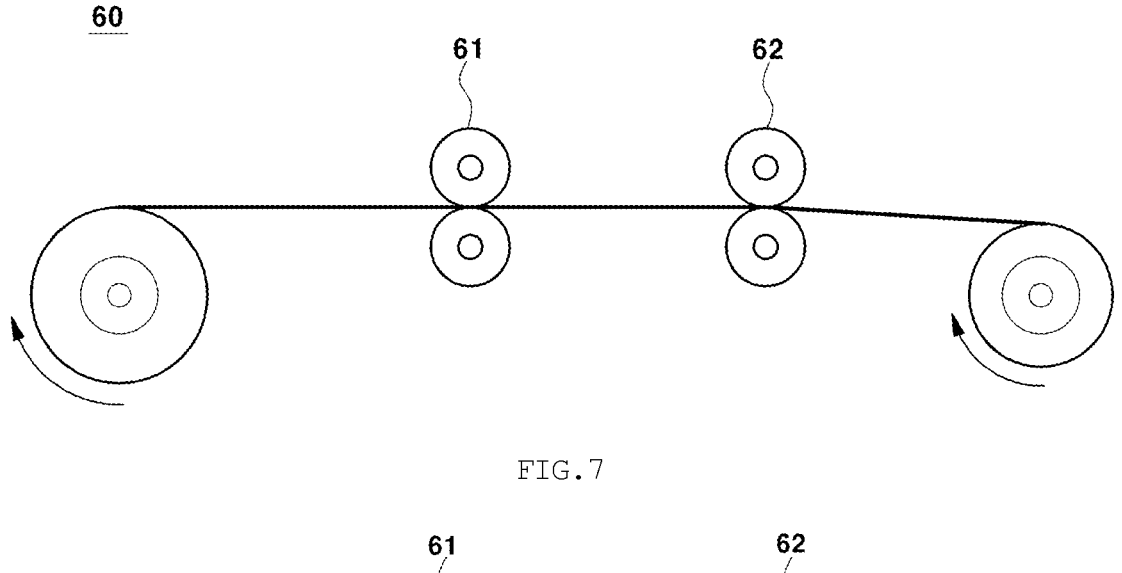
FIG. 7 illustrates the restoration unit according to one exemplary embodiment of the present disclosure.
FIG. 8 refers to for description of the restoration unit in FIG. 7.

FIG. 7 illustrates a restoration unit 60. The restoration unit 60 may include a holding member 61 and a moving member 62. The holding member 61 securely holds the substrate on which the catalyst layer is formed. The moving member 62 is positioned after the holding member 61, pulls the securely held substrate, and thus spreads out the folded region of the substrate.

With reference to FIG. 8, except for the catalyst layer, the holding member 61 holds the substrate by the edge.

Figure 10:
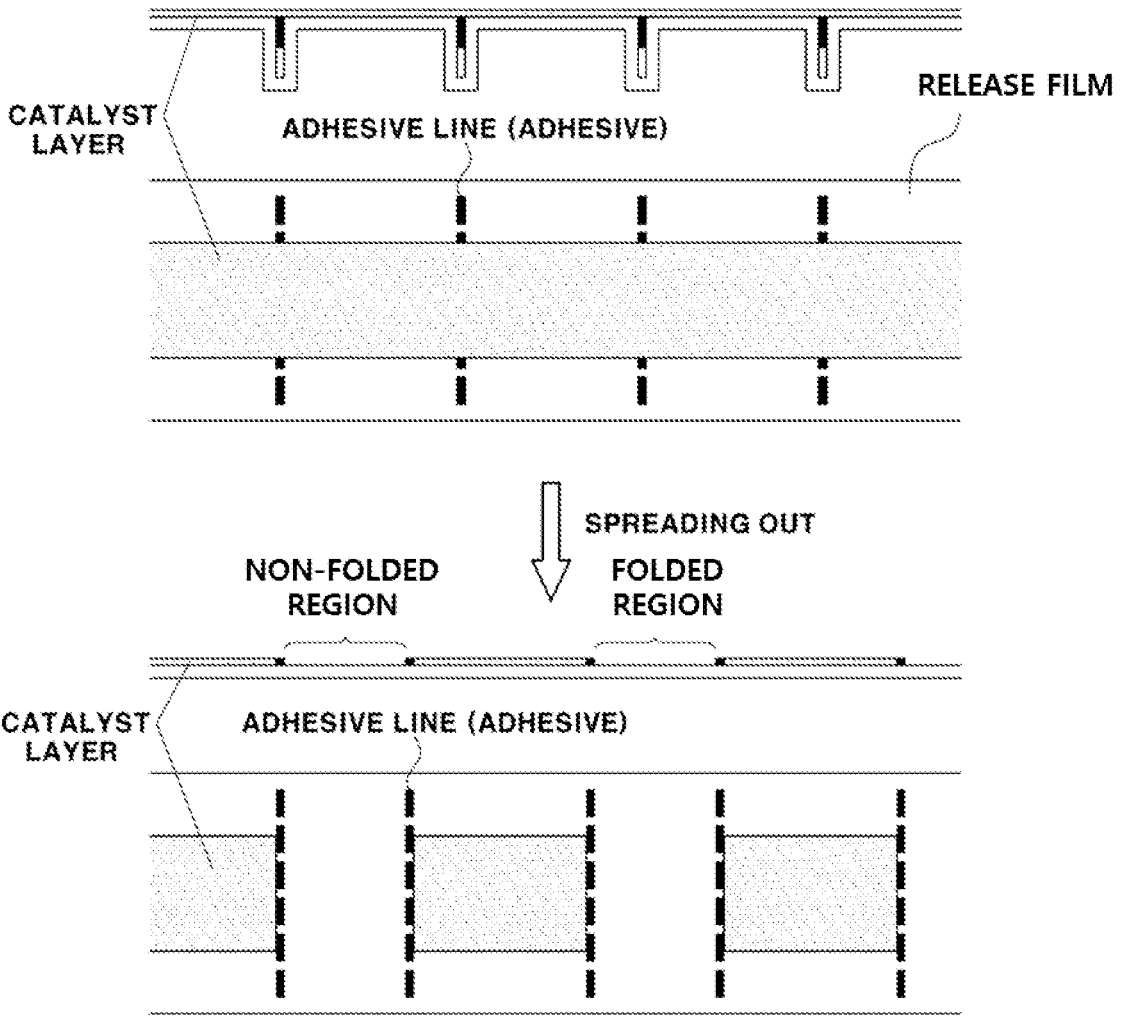
FIG. 10 refers to for description of an electrode that is manufactured by the apparatus for manufacturing the electrode for the fuel cell according to one exemplary embodiment of the present disclosure.

With reference to FIG. 10, the moving member 62 rotates in the forward direction in a state where the holding member 61 securely holds the substrate. Thus, an external force is applied to the substrate, and the folded region of the substrate is physically spread out. The catalyst layer is formed to be spaced a length of the folded region in the progress direction apart can be obtained.

Although the specific embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. An apparatus for manufacturing a substrate for a fuel cell, the apparatus comprising:

a supply unit providing a film;

a bonding unit positioned after the supply unit and forming a substrate including folded regions that result from intermittently folding up portions of the film and a non-folded region between the folded regions; and a collection unit positioned after the bonding unit and collecting the substrate.

2. The apparatus of claim 1, wherein the substrate comprises a release film or an electrolyte membrane.

3. The apparatus of claim 1, wherein the bonding unit comprises:

a first roller member positioned on one side of the film and rotatable in a state of being brought into contact with the film;

a first pressing member positioned on an opposite side of the first roller member with the film interposed therebetween in a first direction and supporting a lower surface of the film;

a second roller member positioned to be spaced apart from the first roller member in a lengthwise direction, positioned on the one side of the film and rotatable in a state of being brought into contact with the film; and a second pressing member positioned to be spaced apart from the first pressing member in the lengthwise direction, positioned on the opposite side of the second roller member with the film interposed therebetween, and supporting the lower surface of the film, wherein at least one of the first pressing member or the second pressing member is disposed to be laterally movable in the lengthwise direction.

4. The apparatus of claim 3, wherein the first pressing member comprises a first pressing surface facing a predetermined area at an end portion of the second pressing member, and the second pressing member comprises a second pressing surface facing a predetermined area at an end portion of the first pressing member.

5. The apparatus of claim 3, wherein the bonding unit further comprises:

an adhesive supply member positioned between the first roller member and the second roller member and providing an adhesive to an upper surface of the film.

6. The apparatus of claim 5, wherein the adhesive supply member is configured to provide the adhesive along a widthwise direction of the film perpendicular to the lengthwise direction and thus to form an adhesive line, and a length of the adhesive line is greater than a predetermined width of an electrode.

7. The apparatus of claim 6, wherein the bonding unit is configured to operate:

a first phase of rotating the first roller member and the second roller member in a forward direction and moving the film in a progress direction;

a second phase of stopping the rotation of the first roller member and the second roller member and thus securely holding the film;

a third phase of rotating the second roller member in a reverse direction and thus a portion of the film enters a space between the first pressing member and the second pressing member;

a fourth phase of laterally moving at least one of the first pressing member or the second pressing member and forming the substrate by folding up the portion of the film; and a fifth phase of returning the at least one of the first pressing member or the second pressing member to an original position thereof, rotating the first roller member and the second roller member in the forward direction, and moving the substrate in the progress direction.

8. The apparatus of claim 7, wherein the adhesive supply member is configured to provide the adhesive to the film in the second phase.

9. The apparatus of claim 3, wherein the bonding unit further comprises:

a bar positioned between the first roller member and the second roller member and pressing against the film in the first direction.

10. An apparatus for manufacturing an electrode for a fuel cell, the apparatus comprising:

the apparatus of claim 1; and a coating unit providing catalyst slurry to the substrate and thus forming a catalyst layer, the substrate being supplied to the coating unit from the apparatus of claim 1.

11. The apparatus of claim 10, further comprising:

a restoration unit positioned after the coating unit, receiving the substrate on which the catalyst layer is formed, and spreading out the folded region of the substrate.

12. The apparatus of claim 11, wherein the restoration unit comprises:

a holding member securely holding the substrate on which the catalyst layer is formed; and a moving member after the holing member, pulling the securely held substrate, and thus spreading out the folded region of the substrate.

13. The apparatus of claim 12, wherein the holding member holds the edge of the substrate on which the catalyst layer is formed, except for the catalyst layer.

* * * * *